United States Patent [19]

Crivello

[11] Patent Number: 5,486,545

[45] Date of Patent: Jan. 23, 1996

[54] PROCESS FOR MAKING PROPENYL ETHERS AND PHOTOPOLYMERIZABLE COMPOSITIONS CONTAINING THEM

[75] Inventor: James V. Crivello, Clifton Park, N.Y.

[73] Assignee: Rensselaer Polytechnic Institute, Troy, N.Y.

[21] Appl. No.: 232,507

[22] Filed: Apr. 25, 1994

Related U.S. Application Data

[62] Division of Ser. No. 988,214, Dec. 9, 1992, abandoned.

[51] Int. Cl.$^6$ ..................... C08F 2/46
[52] U.S. Cl. ............. 522/31; 522/181; 568/606; 568/654
[58] Field of Search ............ 522/31, 181; 568/606, 568/654

[56] References Cited

U.S. PATENT DOCUMENTS

| | | | |
|---|---|---|---|
| 4,058,400 | 11/1977 | Crivello | 96/86 |
| 4,058,401 | 11/1977 | Crivello | 96/115 |
| 4,219,654 | 8/1980 | Crivello | 564/342 |
| 4,610,952 | 9/1986 | Crivello | 430/325 |
| 4,864,054 | 9/1989 | Crivello et al. | 560/64 |
| 5,045,572 | 9/1991 | Plotkin et al. | 522/31 |
| 5,055,357 | 10/1991 | Plotkin et al. | 522/31 |
| 5,079,378 | 1/1992 | Crivello | 556/64 |

FOREIGN PATENT DOCUMENTS 2023565  3/1991  Canada.

OTHER PUBLICATIONS

Crivello, James V. & Conlon, David A., "Systhesis, Characterization, and Properties of Novel Aromatic Bispropenyl Ethers", Journ. of Polymer Sci., Polymer Chemistry Edition, vol. 22, pp. 2105–2121, 1984.

"New Synthesis of Aryl–Substituted Sulfonium Salts and Their Applications in Photoinitiated Cationic Polymerization," by S. R. Akhtar, J. V. Crivello, J. L. Lee, and M. L. Schmitt; Chemistry of Materials, vol. 2, No. 6, (1990), pp. 732–737.

"Structure and Reactivity α,β–Unsaturated Ethers. II. Cationic Copolymerizations of Propenyl Isobutyl Ether," by T. Okuyama, T. Fueno and J. Furukawa; Journal of Polymer Science: Part A–1, vol. 6, (1968), pp. 993–1000.

"Cationic Polymerization of α,β–Disubstituted Olefins. Part II. Cationic Polymerization of Propenyl n–Butyl Ether," by A. Mizote, S. Kusudo, T. Higashimura, and S. Okamura; Journal of Polymer Science: PartA–1, vol. 5, (1967), pp. 1727–1739.

"Structure and Reactivity of α,β–Unsaturated Ethers, XIII. Cationic Copolymerization and Acid–Catalyzed Hydrolysis of 1,2–Dialkoxyethylenes," by T. Okuyama and T. Fueno; Journal of Polymer Science: Part A–1, vol. 9, (1971), pp. 629–638.

"Structure and Reactivity of α,β–Unsaturated Ethers. III. Cationic Copolymerizations of Alkenyl Alkyl Ethers," by T. Okuyama, T. Fueno, J Furukawa and K. Uyeo; Journal of Polymer Science: Part A–1, vol. 6, (1968), pp. 1001–1007.

"Structure and Reactivity of α,β–Unsaturated Ethers. VII. Electronic Effects of the β–Methyl Substitution on the Cationic Polymerizabilities of Alkyl Vinyl Ethers," by T. Fueno and T. Okuyama; Journal of Polymer Science: Part A–1, vol. 7, (1969), pp. 3219–3228.

*Primary Examiner*—Mark A. Chapman
*Attorney, Agent, or Firm*—Heslin & Rothenberg

[57] ABSTRACT

Propenyl ether monomers of formula V $$A(OCH=CHCH_3)_n$$

wherein n is an integer from one to six and A is selected from cyclic ethers, polyether and alkanes are disclosed. The monomers are readily polymerized in the presence of cationic photoinitiators, when exposed to actinic radiation, to form poly(propenyl ethers) that are useful for coatings, sealants, varnishes and adhesives. Compositions for preparing polymeric coatings comprising the compounds of formula V together with particular cationic photoinitiators are also disclosed, as are processes for making the monomers from allyl halides and readily available alcohols. The process involves rearranging the resulting allyl ethers to propenyl ethers.

4 Claims, No Drawings

PROCESS FOR MAKING PROPENYL ETHERS AND PHOTOPOLYMERIZABLE COMPOSITIONS CONTAINING THEM

STATEMENT OF RIGHTS UNDER FEDERALLY SPONSORED RESEARCH

This invention was made with support under Department of Energy Grant No. DE-FG02-91ER12117. Accordingly, the U.S. Government may have certain rights in the invention. This application is a division, of application Ser. No. 07/988,214, filed Dec. 9, 1992, now abandoned.

BACKGROUND OF THE INVENTION

1. Field of the Invention

The invention relates to a process for the synthesis of mono and polyfunctional aliphatic propenyl ethers by an improved synthesis and rearrangement of allyl ethers. The invention also relates to novel mono and polyfunctional propenyl ethers that are available by the process of the invention and to compositions for preparing polymeric coatings containing the propenyl ethers.

2. Information Disclosure

Polymers of vinyl ethers are well known as coating materials, sealants, varnishes, adhesives and inks. A common method for the production of such polymers involves the cationic polymerization of vinyl ether monomers (I), according to equation 1.:

Equation 1

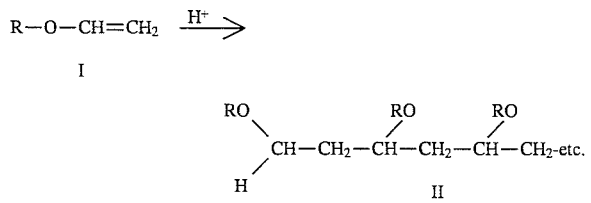

The commercial synthesis of vinyl ethers involves the base catalyzed condensation of alcohols with acetylene at high temperatures and under pressure in an autoclave as shown in equation 2.:

Equation 2

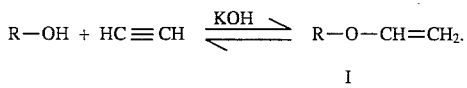

Although the starting materials—acetylene and alcohols—are economically attractive, the usual synthesis of the monomer is inconvenient and expensive to carry out. Since equation 2 describes an equilibrium process, it is difficult to achieve high conversions, particularly of di and multifunctional vinyl ethers. Furthermore, many side reactions, such as cyclizations, also occur with these starting materials substantially limiting the utility of this synthetic method. As a result, only a few difunctional vinyl ether monomers are currently available from commercial sources. Monomers that have the advantage of the high reactivity of vinyl ethers, but which are more easily prepared would be most desirable.

Propenyl ethers have been reported to undergo facile cationic polymerization. These monomers differ structurally from vinyl ethers only by the presence of a methyl group on the β-carbon. The methyl group further activates the double bond towards cationic polymerization by increasing the electron density of the double bond but at the same time, slightly retards its reactivity by steric hindrance. Comparisons between the rates of cationic polymerization of vinyl and propenyl ethers have shown that, when the catalyst was boron trifluoride etherate, the propenyl ethers were more reactive than the vinyl ethers. Further investigation showed that the cis isomer was more reactive than the trans isomer in these cationic polymerizations.

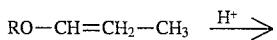

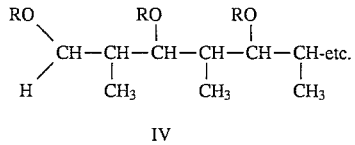

It thus appears that, if a good synthesis of the propenyl ether monomers (III) were available, an attractive alternative to vinyl ether polymerization would be provided.

Mizote et al. [J. Polym.. Sci., Polym. Chem. Ed. 5, 1727 (1967)] disclosed the preparation of various monofunctional alkyl-substituted propenyl ethers by the sequence of reactions given in Scheme 1.

Scheme 1

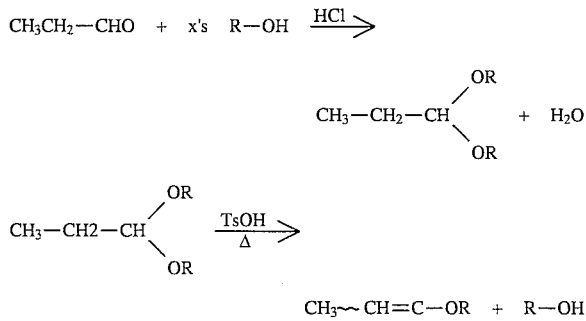

In this scheme, propionaldehyde is condensed with an excess of the desired alcohol under acidic conditions to form the corresponding acetal. The acetal is then heated in the presence of p-toluenesulfonic acid to generate the desired propenyl ether with the elimination of one mole of the alcohol. Generally, the overall yields are in the range of 60–80% depending on the structure of the starting alcohol. When n-butanol is used, a mixture of 75% trans and 25% cis n-butylpropenyl ether is produced. If desired, the isomers can be separated and purified by fractional distillation.

While this method works well for low molecular weight propenyl ethers, complications due to side reactions make it less effective for the preparation of high molecular weight members of this series of monomers and particularly for multifunctional propenyl ethers. In fact, the literature is almost devoid of examples of multifunctional propenyl ethers. Only one reference can be found to the preparation of such compounds, and it discloses only polypropenyl ethers centered on an aromatic nucleus (U.S. Pat. 4,864,054). Compositions consisting of cationically photopolymerizable mono and multifunctional aliphatic propenyl ethers do not appear to have been described in the literature.

There is thus a need for a general synthesis of aliphatic polypropenyl ethers from readily available starting materials.

SUMMARY OF THE INVENTION

It is an object of the invention to provide a general synthesis of propenyl ether monomers and polymers from readily available starting materials.

It is a further object to provide a process for the cationic photopolymerization of propenyl ethers.

It is a further object to provide novel and useful monomers and polymers resulting therefrom that can be used as coatings, sealants, varnishes and adhesives.

These and other objects, features and advantages are provided by the present invention. In one aspect, the invention relates to a process for preparing a compound of formula V $$A(OCH=CHCH_3)_n \qquad V$$

wherein n is an integer from 1 to 6; and A is selected from the group consisting of cyclic ethers, polyethers, and linear, branched or cyclic alkanes containing from two to twenty carbons comprising the steps of: (a) reacting a compound of formula $$A(OH)_n$$

with allyl bromide or allyl chloride in the presence of an acid acceptor to form an allyl ether of formula $$A(OCH_2CH=CH_2)_n; \text{ and}$$

(b) treating said allyl ether with a catalytic amount of an isomerization catalyst to convert substantially all allyl ethers to 1-propenyl ethers. The isomerization catalyst is preferably a ruthenium, rhodium, palladium or platinum catalyst, most preferably tris(triphenylphospine)ruthenium (II) dichloride. The condensation of the alcohol with allyl bromide or allyl chloride is preferably carried out in aqueous base in the presence of a phase transfer catalyst. A particularly preferred process comprises the steps of: (a) reacting a compound of formula $A(OH)_n$ with allyl bromide in aqueous potassium hydroxide in the presence of tetra-n-butylammonium bromide to form an allyl ether of formula $A(OCH_2CH=CH_2)_n$; and (b) treating the allyl ether with from 0.1 to 2.0% by weight of tris(triphenylphospine)ruthenium (II) dichloride at from 80° to 150° C. until substantially all allyl ethers are converted to 1-propenyl ethers. Throughout the specification the variables are defined when introduced and retain that definition in all subsequent occurrences.

In another aspect the invention relates to novel products of the above process, namely to compounds of formula VI $$A(OCH=CHCH_3)_m \qquad VI$$

wherein m is an integer from one to six, with the proviso that when m is one, A is a cyclic ether, a polyether or an alkane of 8 to 20 carbons. Preferred classes of the compounds of formula VI include compounds of formula $CH_3CH=CHO-(CH_2)_p-OCH=CHCH_3$ wherein p is an integer from two to twenty, particularly wherein p is two, four, six or ten; compounds of formula $$CH_3CH=CHO-(CH_2CHO)_r\overset{R^1}{\underset{|}{\phantom{C}}}CH=CHCH_3$$

wherein $$-(CH_2CHO)_r-\overset{R^1}{\underset{|}{\phantom{C}}}$$

represents a mixture of polypropylene oxide and polyethylene oxide $$(CH_2CHO)\overset{CH_3}{\underset{|}{\phantom{C}}} \text{ and } (CH_2CH_2O)$$

units in any combination or order, and r is an integer from two to twenty; compounds of formula $$\begin{array}{c} OCH=CHCH_3 \\ | \\ CH_2-(CH)_s-CH_2 \\ | \qquad\qquad | \\ OCH=CHCH_3 \quad OCH=CHCH_3 \end{array}$$

wherein s is zero or an integer from one to four; compounds of formula $$\begin{array}{c} OCH=CHCH_3 \\ | \\ CH_2 \\ | \\ CH_3CH=CHO-CH_2-C-CH_2-OCH=CHCH_3 \\ | \\ CH_2 \\ | \\ OCH=CHCH_3 \end{array}$$

and compounds of formula $$ROCH=CHCH_3$$

wherein R is alkyl of 8 to 20 carbons.

Preferred polyethers include compounds of formula $CH_3CH=CHO-(CH_2CH_2O)_r-CH=CHCH_3$ and compounds of formula $$CH_3CH=CHO(CH_2CHO)_r\overset{CH_3}{\underset{|}{\phantom{C}}}CH=CHCH_3$$

In a further aspect, the invention relates to compositions for preparing a polymeric coating comprising the foregoing compounds of formula V together with from 0.01% to 20% by weight of a cationic photoinitiator. Preferred photoinitiators include iodonium salts and sulfonium salts, particularly substituted triphenyl sulfonium hexafluoroantimonates.

In a further aspect, the invention relates to polymers which are the products of a process comprising the steps of (a) preparing a mixture of a monomer of formula VI and from 0.01 to 20% by weight of a cationic photoinitiator chosen from the group consisting of diaryliodonium, triarylsulfonium, diaryliodosonium, triarylsulfoxonium, dialkylphenacyl sulfonium, and dialkylhydroxyphenyl sulfonium salts; and (b) exposing the mixture to ultraviolet light for a period of time sufficient to produce a solid polymer which is insoluble in common solvents. The polymer is also infusible, by which is meant that it does not melt at any temperature below its decomposition temperature. Common solvents are, for example, hydrocarbons, ethers, ketones and esters. Typical solvents are toluene, cyclohexane, tetrahydrofuran, ethyleneglycol dimethyl ether, methylethyl ketone and ethyl acetate.

DETAILED DESCRIPTION OF THE INVENTION

The general synthetic pathway of the invention is shown in Scheme 2. It can be employed for the preparation of a wide diversity of mono, di and multifunctional propenyl ethers. The corresponding allyl ether precursors are prepared by the direct condensation of an alcohol with allyl bromide in the presence of solid KOH and a phase transfer catalyst such as tetra-n-butylammonium bromide. Typically, this reaction proceeds in very high yields. Allyl chloride can be substituted for allyl bromide, but the reaction times must be lengthened to achieve comparable conversions. Isomerization of the allyl ether to the corresponding propenyl ether is carried out by treatment with an isomerizing catalyst such as tris(triphenylphosphine)ruthenium (II) dichloride.

Scheme 2

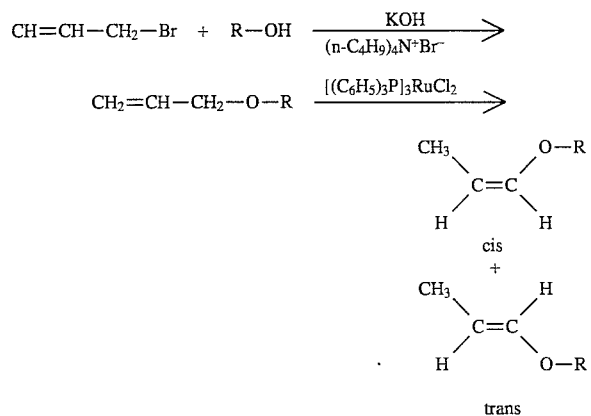

This approach to the synthesis of cationically polymerizable multifunctional propenyl ethers has several very attractive features. First, it takes advantage of readily available and inexpensive mono, di and multifunctional alcohols derived from both natural and synthetic sources. For example, simple three to six carbon sugars, ethylene glycol and glycerol as well as cetyl, myristyl, lauryl, and stearyl alcohols are commonly available as natural products from biorenewable sources and may be employed in the reactions shown in Scheme 2.

Allyl bromide and chloride are both inexpensive and widely available correactants. Second, the phase transfer condensation typically proceeds smoothly to give high yields of the desired mono, di and multifunctional allyl ether intermediates. Third, the isomerizations are very facile and proceed to completion within a few hours. Generally speaking, the monomers prepared using the tris(triphenylphosphine)ruthenium (II) dichloride catalyzed reaction are suitable directly for use in photoinitiated cationic polymerization without the necessity of removing the ruthenium catalyst or further purification of the monomer. Lastly, the propenyl ether monomers prepared using the synthetic methods shown in Scheme 2 are very highly reactive in photoinitiated cationic polymerization, possess interesting properties, and as a consequence, have many potential applications.

Tris(triphenylphosphine)ruthenium (II) dichloride is a preferred isomerization catalyst, but many other platinum metal catalysts, such as those based on rhodium, palladium or platinum can be used. Such catalysts are known in the art for equilibrating an olefin to the most thermodynamically favored isomer. The isomerization could also, in principle, be accomplished with a strong base, such as potassium t-butoxide.

The condensation of allyl bromide or chloride with the appropriate alcohol can be carried out in the presence of any acid acceptor. Soluble organic bases such as triethylamine, or "proton sponge" (N,N,N'N' -tetramethyl-1,8-naphthalenediamine) can be used in organic solvents or alkali metal hydroxides, such as KOH and NaOH can be used in aqueous solutions or optimally in the presence of a phase transfer catalyst. The latter are preferred.

Products of the process are encompassed by the general formula I above. Examples include 1,2-dipropenoxyethane; 1,4-dipropenoxybutane; 1,6-propenoxyhexane; 1,3-dipropenoxypropane; 1,4-cyclohexanedimethanol dipropenyl ether; 1,4-cyclohexane dipropenyl ether; 1,2-dipropenoxypropane; 1,10-dipropenoxydecane; 1,8-dipropenoxyoctane; 1,2,3-tripropenoxypropane; 1,2,3,4-tetrapropenoxybutane; sorbitol hexapropenyl ether; trimethylolpropane tripropenyl ether; pentaerythritol tetrapropenyl ether; 1,2-dipropenoxycyclopentane; 1,3-dipropenoxyperfluoropropane; diethyleneglycol dipropenyl ether; tetraethyleneglycol dipropenyl ether; and 3,4-dipropenoxytetrahydrofuran. The products may consist of pure isomers or mixtures of cis and trans isomers.

The UV curable compositions of the present invention can be made by combining a mono or multifunctional propenyl ether monomer or mixture of such monomers of formula V with an arylonium salt such as a diaryliodonium, triarylsulfonium, diaryliodosonium, triarylsulfoxonium, dialkylphenacylsulfonium or dialkylhydroxyphenylsulfonium salt.

Cationic photoinitiators that are effective in the process of the invention are of the general formulae:

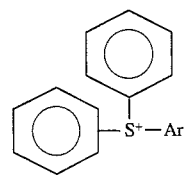

VII

VIIa

VIII

In the above formulae, Ar is substituted phenyl, n represents an integer from 8 to 22 and $MF_6^-$ is $PF_6^-$ $SbF_6^-$ or $AsF_6^-$. The syntheses of these modified onium salts are described in U.S. Pat. Nos. 4,219,654; 4,058,400; 4,058,401 and 5,079,378 and in Akhtar et al. *Chem. of Materials* 2 732–737 (1990) which are incorporated herein by reference. Although various members of the series of onium salts indicated above may be used in the practice of this invention, those bearing the $SbF_6^-$ anion are preferred.

Four photoinitiators that have been found particularly useful are VIIb, VIIc, VIId and VIIIa:

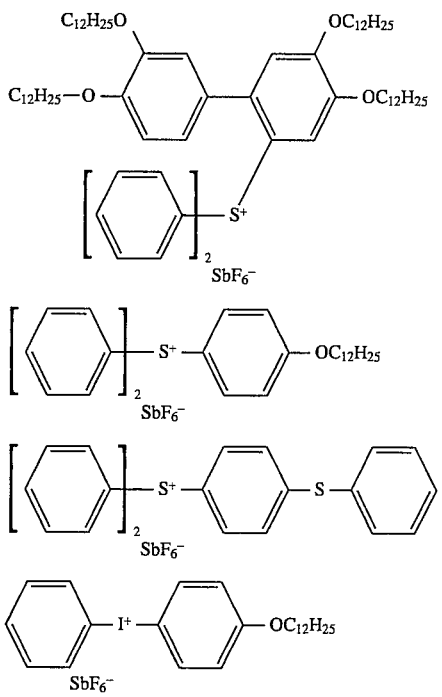

An effective amount of the arylonium salt is from about 0.01% to about 20% by weight.

Substrates which can be coated in accordance with the practice of the present invention are for example, plastic substrates such as polystyrene, polyethylene, polypropylene, polyimide, polycarbonate, polyvinylchloride, polysulfone, and polyethylene terephthalate; metal substrates such as aluminum, iron, steel, copper, brass, titanium, tungsten, gold, platinum, nickel and chromium; and semiconductor substrates such as silicon and gallium arsenide. In addition, glass and glass-epoxy composites can also be used as substrates. Application of the UV curable coating composition onto a substrate can be achieved by roll coating, curtain coating, screen printing, gravure coating, dip coating and knife coating and off-set printing. The thickness of such resins may range from a few microns to 2 cm depending on the application and the conditions of photopolymerization.

Irradiation of substrates treated in accordance with the practice of the invention can be achieved by the use of UV lamps such as mercury arc lamps (high, medium and low pressure), xenon arc lamps, high intensity halogen-tungsten arc lamps, microwave driven arc lamps and lasers. Additional means of irradiation which can be used are, for example, ionizing irradiation using $^{60}$Co γ-rays and electron beam irradiation.

In addition to the monomer and photoinitiator components described above, the coating formulations may also include film forming binders such as polystyrene, poly-α-methylstyrene, polyacenaphthalene, polyindene, polyphenols, and novolac resins. Inorganic fillers such as silica, talc, clay, barytes, hydrated alumina and glass, as well as carbon, polyolefin or polyimide fibers may also be included to provide desirable mechanical characteristics. The above coating materials may also be made sensitive to long wavelength UV and to visible light by the addition of photosensitizers as described in U.S. Pat. No. 4,610,952. Among such photosensitizers may be mentioned Michler's ketone, perylene, pyrene, anthracene, benzophenone, thioxanthone, 2-isopropylthioxanthone and phenothiazine.

The following examples are included by way of illustration and are not intended to be limitations.

Synthesis of 1,2-Diallyloxyethane

Into a 500 mL round bottom three neck flask equipped with an overhead stirrer, thermometer, condenser and nitrogen inlet were placed 31 g (0.50 mol) of 1,2-ethanediol, 182 g (1.5 mol) of allyl bromide, 75 mL of toluene and 60 g (1.5 mole) of NaOH. The reaction mixture was stirred at room temperature for 15 minutes. Then 9 g (0.03 mole) of tetra-n-butylammonium bromide was added and the reaction mixture slowly heated to reflux (50°–60° C.) and maintained at that temperature overnight. The reaction mixture was poured into 500 mL of distilled water, the organic layers were separated and the aqueous layer extracted with fresh toluene. The combined organic layers were washed with three 200 mL portions of distilled water and the organic phase was dried over anhydrous $Na_2SO_4$. Excess allyl bromide and toluene were removed using a rotary evaporator and the reaction mixture was distilled under vacuum. The volatile product amounted to 53 g (74% recovered yield). Fractional distillation gave 99% pure 1,2-diallyloxyethane ether with a boiling point of 55° C./20 mm Hg.

Isomerization of 1,2-Diallyloxyethane to 1,2-Dipropenoxy Ethane

To 46 g (0.32 mol) of 1,2-diallyloxyethane ether in a 100 mL flask equipped with a magnetic stirrer, reflux condenser and nitrogen inlet was added 0.15 g (0.16 mmole) of tris(triphenylphosphine)ruthenium (II) dichloride. The reaction mixture was heated at 120° C. for two hours. Proton NMR showed that the bands assigned to the allyl groups had been completely replaced by new bands assigned to the propenyl ether groups. Gas chromatography gave three peaks which were attributed respectively to the trans,trans, trans,cis and cis,cis isomers of 1,2-dipropenoxyethane.

According to the above procedure the following novel propenyl ethers were synthesized and characterized by NMR and elemental analysis:

TABLE 1

| Experiment No. | Propenyl Ether |
|---|---|
| 2 | 1-Propenoxydecane |
| 3 | 1-Propenoxydodecane |
| 4 | 1,4-Dipropenoxybutane |
| 5 | 1,6-Dipropenoxyhexane |
| 6 | 1,6-Dipropenoxyoctane |
| 7 | 1,10-Dipropenoxydecane |
| 8 | Diethyleneglycoldipropenyl ether |
| 9 | Neopentylglycoldipropenyl ether |
| 10 | Triethyleneglycoldipropenyl ether |
| 11 | Tetraethyleneglycoldipropenyl ether |
| 12 | Trimethylopropanetripropenyl ether |
| 13 | 1,2,3-Tripropenoxypropane |
| 14 | Pentaerythritol tetrapropenyl ether |
| 15 | Sorbitol hexapropenyl ether |

By an analogous procedure it is contemplated that compounds of formula $CH_3CH{=}CHO{-}(CH_2CH_2O)_r{-}CH{=}CHCH_3$ where r averages 5, 6, 7, 9, 14, 22 and 34 can be synthesized from allyl bromide and the corresponding commercially available poly(ethylene glycol). Similarly compounds of the formula $CH_3CH{=}CHO[CH(CH_3)CH_2O]_r OCH{-}CHCH_3$ where r averages 7, 12, 17 and 34 can be synthesized from allyl bromide and the corresponding commercially available poly (propylene glycol).

UV Cure of Propenyl Ether Monomers

Mixtures of the monomer shown in Table 2 each containing 0.5 mol % of indicated onium salt photoinitiator were prepared. These mixtures were spread as 25 μm films on the surface of panel of cold rolled steel and then exposed to a 300 W Fusion Systems Inc. microwave driven UV lamp mounted over a Model MC 6R conveyor. In each case, UV cure took place to give dry tack-free films at a conveyor speed of 6 m/min.

TABLE 2

| Experiment No. | Monomer | Photoinitiator |
|---|---|---|
| 16 | 1,4-dipropenoxybutane | VII b |
| 17 | 1,2,3-tripropenoxypropane | VII c |
| 18 | pentaerythritoltetrapropenyl ether | VII c |
| 19 | sorbitol hexapropenyl ether | VII b |

The crosslinked films which were produced were hard, transparent and colorless. They were also insoluble in common solvents. Exposure to water in all cases resulted in corrosion of the steel except where covered by the polymerized propenyl ether coatings.

Differential scanning photocalorimetry (DSP) is known to be useful for directly monitoring the rate and extent of the cationic photoinitiated polymerizations of epoxide monomers. This method was employed to determine the general order of propenyl ether reactivity with respect to vinyl ethers and epoxides of similar structure using identical amounts of the same photoinitiator. The photopolymerizations of propenyl ethers were found to be extremely rapid. A comparison of the three curves showed that the propenyl ether monomers were very much more reactive than epoxides, as well as considerably more reactive than analogous vinyl ethers. Propenyl ether monomers are the most rapidly polymerizing monomers yet examined in photoinitiated cationic polymerization. As a result, DSP is not sufficiently sensitive to allow it to be used for distinguishing among the reactivities within a series of related propenyl ethers.

Real time infrared spectroscopy (RTIR) has been shown to be an excellent method for determining both the rate and extent of free radical and cationic photopolymerizations. It is particularly advantageous for following the rates of extremely rapid photopolymerizations. The application of this technique involves simultaneous UV irradiation of a monomer while monitoring the decrease of the characteristic band at 1660–1680 cm$^{-1}$ due to the carbon-carbon double bond of the propenyl ether group. A thin, 25 μm layer of the liquid monomer containing the photoinitiator was placed between two 25 μm films of polyethylene which were then mounted in 5 cm×5 cm slide frames. A fast strip chart recorder was used to monitor the change in the selected IR band.

A direct impression of the reactivity and extent of polymerization can be obtained by a simple inspection of the curves. More quantitative information can be gathered from the calculation of total conversions after 200 seconds irradiation which are presented in Table 3. Also shown in this table are indications of the solubility of the photoinitiators in the respective monomers. The photoinitiator concentration was 0.5 mole % based on monomer and the solubility of the initiator in the monomer is indicated as good (G), poor (P) or insoluble (I). A substantial induction period was observed for initiators VIIb and VIIc. As may be noted, many of the propenyl ether monomers are poor solvents even for diaryliodonium and triarylsulfonium salt photoinitiators which have been modified specifically to improve their solubility characteristics. Among the photoinitiators examined, VIIb is the most soluble in the propenyl ether monomers while VIIIa and VIIc exhibit considerably poorer solubility characteristics and VIId is completely soluble at the 0.5 mole % level only in relatively polar monomers such as 1,2-propenoxyethane and diethylene glycol dipropenyl ether. It may also be seen from Table 3 that the solubility of all the photoinitiators is optimal for the difunctional propenyl ethers and decreases markedly for both long alkyl chain monofunctional monomers and as the number of propenyl groups increases.

TABLE 3

| Monomer | Total Conversion (%) | | | |
|---|---|---|---|---|
| | VIIa | VIId | VIIc | VIIb |
| Z-Furfurylpropenyl ether | 85 (G) | 93 (G) | 81 (G) | 76 (G) |
| 1-Propenoxydecane | (I) | (I) | (I) | 90 (G) |
| 1-Propenoxydodecane | (I) | (I) | (I) | 92 (G) |
| 1,2-Dipropenoxyethane | 77 (G) | 80 (G) | 94 (G) | 74 (G) |
| 1,4-Dipropenoxybutane | 89 (G) | (I) | 84 (G) | 94 (G) |
| 1,6-Dipropenoxyhexane | 77 (P) | (I) | 96 (G) | 84 (G) |
| 1,10-Dipropenoxydecane | 76 (D) | (I) | 79 (P) | 90 (G) |
| Neopentylglycol dipropenyl ether | 43 (P) | (I) | 57 (P) | 69 (G) |
| Diethylene glycol dipropenyl ether | 96 (G) | 89 (G) | 86 (G) | 87 (G) |
| Triethylene glycol dipropenyl ether | 87 (G) | 91 (G) | 90 (G) | 93 (G) |
| Tetraethylene glycol dipropenyl ether | 89 (G) | 91 (G) | 93 (G) | 94 (G) |
| 1,2,3-Tripropenoxypropane | 58 (G) | (I) | 64 (G) | 67 (G) |
| Pentaerythritol tetrapropenyl ether | (I) | (I) | (I) | 36 (G) |
| Sorbitol hexapropenyl ether | (I) | (I) | (I) | 15 (G) |

While the invention has been particularly shown and described with reference to preferred embodiments thereof, it will be understood by those skilled in the art that other changes in form and details may be made therein without departing from the spirit and scope of the invention.

I claim:

1. A product of the process comprising
   (a) preparing a mixture of at least one monomer selected from the group consisting of
   (i) neopentylglycol dipropenyl ether;
   (ii) compounds of the formula

$$CH_3CH=CHO-(CH_2)_p-OCH=CHCH_3 \qquad (I); \text{ and}$$

(iii) compounds of the formula

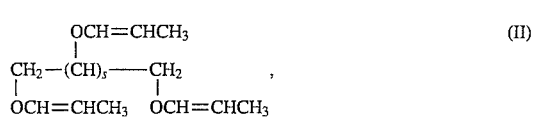

$$\begin{array}{c} OCH=CHCH_3 \\ | \\ CH_2-(CH)_s-CH_2 \\ | \qquad\qquad | \\ OCH=CHCH_3 \quad OCH=CHCH_3 \end{array} \qquad (II),$$

wherein p is an integer from 2 to 20; and s is 0 or an integer from 1 to 4; and from 0.01 to 20% by weight of a cationic photoinitiator chosen from the group consisting of diaryliodonium, triarylsulfonium, diaryliodosonium, triarylsulfoxonium, dialkylphenacyl sulfonium, and dialkylhydroxyphenyl sulfonium salts; and
   (b) exposing said mixture to ultraviolet light for a period of time sufficient to produce a solid polymer which is infusible and insoluble in common solvents.

2. The product of claim 1, wherein the compounds of formula (I) are selected from the group consisting of 1,2-dipropenoxyethane; 1,4-dipropenoxybutane; 1,6-dipropenoxyhexane; and 1,10-dipropenoxydecane.

3. The product of claim 1, wherein the compounds of formula (II) are selected from the group consisting of sorbitol hexapropenyl ether and 1,2,3-tripropenoxypropane.

4. The product of claim 1, wherein the process steps are carried out in an atmosphere which comprises oxygen.

* * * * *